(12) United States Patent
Schuesslburner et al.

(10) Patent No.: US 10,988,317 B2
(45) Date of Patent: Apr. 27, 2021

(54) FORMAT PART FOR DEFLECTING CONTAINERS

(71) Applicant: KRONES AG, Neutraubling (DE)

(72) Inventors: Helmut Schuesslburner, Straubing (DE); Konrad Senn, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/388,397

(22) Filed: Apr. 18, 2019

(65) Prior Publication Data

US 2019/0322458 A1   Oct. 24, 2019

(30) Foreign Application Priority Data

Apr. 19, 2018 (DE) ...................... 10 2018 205 981.0

(51) Int. Cl.
   *B65G 21/20* (2006.01)
   *B65G 21/14* (2006.01)
   *B65G 21/16* (2006.01)

(52) U.S. Cl.
   CPC ............ *B65G 21/14* (2013.01); *B65G 21/16* (2013.01); *B65G 21/2072* (2013.01); *B65G 2201/0244* (2013.01); *B65G 2207/08* (2013.01)

(58) Field of Classification Search
   CPC ................ B65G 21/14; B65G 21/2072; B65G 21/2081; B65G 47/5122; B65G 47/5131; B65G 2207/08
   USPC ............ 198/374.1, 374.4, 812, 836.1, 836.2, 198/836.3
   See application file for complete search history.

(56) References Cited

U.S. PATENT DOCUMENTS

| 1,857,566 | A | * | 5/1932 | Perry | ...................... B21B 43/06 |
| | | | | | 198/836.3 |
| 2,229,605 | A | * | 1/1941 | Snyder | ............... B65G 21/2072 |
| | | | | | 198/836.3 |
| 2,951,574 | A | * | 9/1960 | Craig | ................... B65G 47/088 |
| | | | | | 198/836.3 |

(Continued)

FOREIGN PATENT DOCUMENTS

| CN | 101351394 A | 1/2009 |
| DE | 1244652 B | 7/1967 |

(Continued)

OTHER PUBLICATIONS

China National Intellectual Property Administration, Office Action and Search Report Issued in Application No. 201910318164.1, dated Sep. 1, 2020, 13 pages. (Submitted with Partial Translation).

*Primary Examiner* — Joseph A Dillon, Jr.
(74) *Attorney, Agent, or Firm* — McCoy Russell LLP (57) ABSTRACT

A format part for deflecting containers, comprising a toggle lever which comprises a toggle joint and two ankle joints, wherein the format part comprises a railing fastened to the toggle joint of the toggle lever, wherein the ankle joints are displaceable in one plane, which is parallel to the running direction of the railing, and wherein the railing is displaceable parallel to said plane by the displacement of the ankle joints, wherein the format part is adaptable for different container formats by the displacement of the railing, accumulating conveyor comprising such a format part, and method for adjusting such a format part.

13 Claims, 10 Drawing Sheets

(56) References Cited

U.S. PATENT DOCUMENTS

| | | | | |
|---|---|---|---|---|
| 3,061,303 | A * | 10/1962 | Glaser | B65H 5/38 |
| | | | | 271/171 |
| 3,527,336 | A | 9/1970 | Johnston | |
| 3,767,027 | A | 10/1973 | Pund et al. | |
| 3,858,711 | A * | 1/1975 | Barker | B65G 37/005 |
| | | | | 198/562 |
| 4,413,724 | A * | 11/1983 | Fellner | B65G 47/5122 |
| | | | | 198/594 |
| 4,436,446 | A * | 3/1984 | Gordon | B25B 5/08 |
| | | | | 198/836.1 |
| 4,513,858 | A * | 4/1985 | Fellner | B65G 47/5122 |
| | | | | 198/812 |
| 5,099,979 | A * | 3/1992 | Kehrel | B26D 7/01 |
| | | | | 198/345.1 |
| 5,137,140 | A * | 8/1992 | Lecrone | B65G 21/2072 |
| | | | | 198/732 |
| 5,350,055 | A * | 9/1994 | Lecrone | B65G 19/02 |
| | | | | 198/718 |
| 5,394,979 | A * | 3/1995 | Hall | B65H 1/30 |
| | | | | 198/836.3 |
| 6,059,096 | A * | 5/2000 | Gladieux | B65G 21/2072 |
| | | | | 198/836.3 |
| 6,305,528 | B1 * | 10/2001 | Leonard | B65G 21/2072 |
| | | | | 198/836.3 |
| 6,460,689 | B2 * | 10/2002 | Albrecht | B42C 19/08 |
| | | | | 198/735.3 |
| 6,550,602 | B2 * | 4/2003 | Steeber | B65G 21/18 |
| | | | | 198/347.4 |
| 6,913,132 | B2 * | 7/2005 | Spatafora | A24C 5/35 |
| | | | | 198/347.1 |
| 8,162,127 | B2 * | 4/2012 | Humele | B65G 17/18 |
| | | | | 198/347.1 |
| 8,365,905 | B2 * | 2/2013 | Fege | B65G 47/5122 |
| | | | | 198/812 |
| 8,469,181 | B2 * | 6/2013 | Figarski | A24C 5/35 |
| | | | | 198/812 |
| 8,776,999 | B2 * | 7/2014 | Yohe | B65G 15/62 |
| | | | | 198/861.2 |
| 8,827,067 | B2 * | 9/2014 | Iwasa | B65G 43/08 |
| | | | | 198/401 |
| 10,753,785 | B2 * | 8/2020 | Merz | G01G 11/003 |
| 2002/0195317 | A1 * | 12/2002 | Wipf | B65G 47/5122 |
| | | | | 198/602 |
| 2012/0097504 | A1 * | 4/2012 | Perreard | B65G 21/2072 |
| | | | | 198/836.3 |
| 2013/0284563 | A1 * | 10/2013 | Lopez | B65G 1/12 |
| | | | | 198/459.1 |
| 2014/0116846 | A1 * | 5/2014 | Baechtel | B65G 47/5131 |
| | | | | 198/459.1 |
| 2015/0008099 | A1 * | 1/2015 | Huettner | B65G 21/2063 |
| | | | | 198/717 |
| 2015/0027852 | A1 * | 1/2015 | Konrad | B65G 47/841 |
| | | | | 198/468.11 |
| 2016/0107845 | A1 * | 4/2016 | Bruch | B65G 21/2072 |
| | | | | 198/473.1 |
| 2016/0340129 | A1 * | 11/2016 | Beesley | B65G 47/261 |
| 2017/0341877 | A1 * | 11/2017 | Hanselman | B65G 47/5131 |
| 2019/0375601 | A1 * | 12/2019 | Philipp | B65G 47/268 |
| 2019/0376833 | A1 * | 12/2019 | Merz | B65G 21/2072 |
| 2020/0079593 | A1 * | 3/2020 | Layne | B65G 39/18 |

FOREIGN PATENT DOCUMENTS

| | | |
|---|---|---|
| DE | 102013105431 A1 | 11/2014 |
| EP | 1840051 A1 | 10/2007 |
| FR | 2895382 A1 | 6/2007 |
| FR | 2937619 A1 | 4/2010 |
| JP | S5922218 U | 2/1984 |
| JP | S61193919 U | 12/1986 |
| WO | 2005123553 A1 | 12/2005 |
| WO | 2011139577 A1 | 11/2011 |

* cited by examiner

FORMAT PART FOR DEFLECTING CONTAINERS

CROSS REFERENCE TO RELATED APPLICATIONS

The present application claims priority to German Application No. 10 2018 205 981.0 entitled "FORMAT PART FOR DEFLECTING CONTAINERS," filed Apr. 19, 2018. The entire contents of the above-listed application are hereby incorporated by reference for all purposes.

TECHNICAL FIELD

The disclosure refers to a format part for deflecting containers.

BACKGROUND AND SUMMARY

When containers are handled or processed, they are typically conveyed between container handling stations or processing stations, for example via conveyor belts, other conveyors, transfer stars, smooth surfaces, and the like. If containers of different formats are now to be handled or transported with a container handling device or processing stations, the transport devices must typically be adapted to the respective container format. Such retrofitting typically requires the system to be shut down, and therefore costs time and money.

Particularly in the case of components for deflecting containers, the respective component is often completely replaced when the container format is changed. However, such an exchange of parts is time-consuming.

Also known from the prior art are format parts for guiding containers of all container treatment systems, for example from DE 10 2013 105 431 A1, wherein these format parts can be adjusted to different container sizes, wherein the adjustment is made by adjusting a distance between a first and a second format part element. This distance is adjustable in DE 10 2013 105 431 A1 in a direction perpendicular to the railing and the direction of movement of containers.

WO 2011/139577, WO 2005/123553 and FR 2 937 619 also disclose components for deflecting objects, the adjustment of which can be adapted to different formats of transported objects.

It is now the object of the present disclosure to solve one or more of the above-mentioned problems or to specify a format part which is alternative to the prior art for deflecting containers.

In particular, the disclosure comprises a format part for deflecting containers, comprising a toggle lever which comprises a toggle joint and two ankle joints, wherein the format part comprises a railing fastened to the toggle joint of the toggle lever, wherein the ankle joints are displaceable in one plane, which is parallel to the running direction of the railing, and wherein the railing is displaceable parallel to said plane by the displacement of the ankle joints, wherein the format part is adaptable for different container formats by the displacement of the railing, further comprising an accumulating conveyor comprising one or more format parts, and a method for adjusting a format part, comprising adjusting the toggle lever to set the format part to another container format. Embodiments are implemented in the dependent claims.

A format part according to the disclosure is designed to deflect containers from a first direction into a second direction different from the first direction. For example, the first and second directions can deviate from each other by an angle of 180°, or by 90° or another angle (not equal to 0°. Containers may be or may comprise in particular for example containers for liquids, in particular for example beverage containers, such as beverage bottles made of PET, glass, other plastics and/or metal.

The format part according to the disclosure comprises a toggle lever comprising a toggle joint and two ankle joints. A railing is fastened to the toggle joint of the toggle lever, which railing is comprised by the format part and along which containers can be guided. Typically, the running direction of the railing is (the railing runs) parallel to the transport direction of the containers, so that these can be guided along the railing when being transported, and a movement in a direction sideways to the transport direction can be prevented by the railing.

The ankle joints of the toggle lever are displaceable in a plane parallel to the running direction of the railing and, by displacing the ankle joints, the railing is displaceable parallel to that plane.

For example, if the container is transported horizontally, the format part can be designed in such a way that the ankle joints of the toggle lever are displaceable in horizontal direction.

Typically, both foot levers are displaceable against each other and symmetrically to each other. This displacement of the ankle joints allows the railing to be displaceable parallel to the plane in which the ankle joints of the toggle lever are displaceable. For example, if the ankle joints of the toggle lever are displaceable in horizontal direction, the railing can also be displaceable in horizontal direction.

By displacing the railing, the format part can be adapted (adjusted) to different container formats, e.g. the position of the railing can be adapted in horizontal direction if the railing can be displaced horizontally, so that wider or less wide containers can be guided through the format part. Here, "displaceable in horizontal direction" can in particular mean "displaceable in a direction which in the mounted state of the format part comes to rest in a container treatment system or similar in horizontal direction".

Typically, the plane in which the railing is displaceable is parallel to the plane in which containers in the format part can be conveyed, e.g. horizontally.

A format part according to the disclosure for deflecting containers may comprise several toggle levers and several railings. In particular, more than one toggle lever may be provided on one or more railings.

The railings may comprise a straight part and/or a curved part. Typically, railings comprising a straight part may be fastened to more than one toggle lever. Railings comprising only one curved part are typically fastened to only one toggle lever. "Straight part" and "curved part" may here indicate in particular the shape of the railing in plan view perpendicular to the plane in which the ankle joints of the toggle levers are movable, e.g. from above (in a vertical direction, e.g. when the railing is installed in horizontal direction).

According to the disclosure, a format part may comprise a fixed guide for containers and, opposite to this, the railing. Such an embodiment may be advantageous as only one division of the railing needs to be made on one side, while the other guide for containers remains stationary (fixed). In other embodiments, the format part may include 2 opposing adjustable railings so that a setting to different formats of containers is rendered possible by adjusting the railing position on both sides. Opposing is again typically considered to be parallel to a plane in which the ankle joints of the toggle lever are movable, e.g. in a horizontal direction. In particular, containers can be guided along their direction of movement between the railing and the guide.

Two opposing adjustment mechanisms, e.g. traction means, can be fastened to the ankle joints of the toggle lever on a format part according to the disclosure. For example, a traction means, e.g. a chain, a band or a similar adjustment mechanism, can be fastened to each of two foot levers of a toggle lever. These adjustment mechanisms are typically opposed so that the ankle joints of the toggle lever can be moved against each other axially symmetrically to an axis through the toggle joint.

In particular, these adjustment mechanisms can be guided over the outer radii of the format part, e.g. so that these have to run along as few narrow curves as possible.

A format part can be comprised by a carriage of an accumulating conveyor or be designed as such. In some embodiments, one carriage of an accumulating conveyor can comprise several format parts. In particular, such carriages of an accumulating conveyor are typically designed in such a way that they can be moved along transport lanes of the accumulating conveyor (optionally continuously), which lanes are typically arranged in parallel. In an accumulating conveyor, the containers to be conveyed can typically be in contact with each other, so that by moving one container, said container moves the other containers further.

In particular, an accumulating conveyor may comprise a plurality of parallel-running conveyor belts (or similar conveyors capable of conveying containers, or smooth surfaces facilitating the conveyance of containers), two directly adjacent conveyor belts (or similar conveyors or smooth surfaces) each being designed to convey containers in opposite directions or to permit the conveyance of containers. Typically, the conveyor belts (or similar conveyors or smooth surfaces) and format parts are designed to transport containers in a single track. In particular, in the case of an accumulating conveyor, part of the container movement can be produced by other containers pressing on the containers conveyed in front of them.

By displacing the carriage, which redirects containers from one conveyor belt to the conveyor belt running in parallel, it is possible to control the number of the containers which are positioned on the accumulating conveyor or can be picked up. A particular advantage of such single-track accumulating conveyors is that the sequence of the incoming and outgoing containers is maintained, unlike in other accumulating conveyors in which, for example, containers are collected on an accumulation surface and are further transported from there again.

A carriage of an accumulating conveyor can be designed to deflect containers from one direction to another direction on a single track (and thus to include a deflecting device (format part)). In other embodiments, a carriage of an accumulating conveyor may include a plurality of deflecting devices (format parts) each configured to redirect containers in a single track from a first direction to a second direction. For example, in an accumulating conveyor comprising four or six (or more) single-track (optionally parallel) lanes, a carriage may comprise two or three (or more) format parts, i.e. be designed to deflect the containers from two or three (or more) single-track lanes to the respectively adjacent lane.

Typically a carriage is designed to deflect containers from every second lane to an adjacent lane, e.g. it can redirect for example containers arriving in parallel from a first direction and an opposite second direction.

In a format part according to the disclosure, the adjustment mechanisms of ankle joints of several toggle levers can be adjusted simultaneously. In particular, the adjustment mechanisms of several or all of the toggle levers encompassed by the format part can be connected to each other in such a way that they can be adjusted by a single adjustment process (all simultaneously). In the case of a carriage comprising a plurality of format parts, in particular the adjustment mechanisms of ankle joints of toggle levers of a plurality of format parts, in particular the adjustment mechanisms of ankle joints of all the toggle levers comprised in the carriage (i.e. of all the toggle levers in the format parts comprised by the carriage), may be simultaneously adjustable. This is advantageous as it reduces the time required to change formats. The knee levers can optionally be continuously adjustable by way of the adjustment mechanisms.

In particular, the adjustment mechanisms can be adjusted via an adjustment aid, e.g. a handwheel, or with an automatic adjustment aid, e.g. by a hydraulic system or a servo motor. In the case of a handwheel, this can typically also be adjusted by one hand.

Typically, in the case of a format part according to the disclosure, the adjustment mechanisms can be locked so that they are not inadvertently moved again from a position once set. Such a locking of the adjustment mechanisms can, for example, take place via a clamping lever or a self-stopping mechanism. In the case of a carriage which comprises several format parts, it may be possible for the adjustment mechanisms to be locked simultaneously (with one or more locking mechanisms) for all format parts.

A handwheel (or other adjustment aid) can be comprised by a format part or carriage. Alternatively, a format part or carriage can also be designed without an adjustment aid (e.g. handwheel). In this case, the adjustment aid (e.g. handwheel) for adjusting the format part (or format parts) can be located, for example, at the outermost position of a carriage. The outermost position of the carriage is the outermost position of the carriage into which the carriage can be moved, e.g. in an accumulating conveyor the position where the largest number of containers can be accommodated in the accumulating conveyor. In a method according to the disclosure, the carriage can be moved to the outermost position. There, e.g. by means of a handwheel, all railings of the format parts of the carriage can then be adjusted on a stationary adjustment unit with only one adjustment operation. This can be done, for example, by a suitable transfer device at the stationary adjustment unit of the accumulating conveyor, which can be located, for instance, either behind the transport table or underneath it. It goes without saying that another adjustment aid can also be used there, e.g. automatically by hydraulics or a servomotor. If a new format has been selected, the carriage can be moved again to another position, e.g. to the position from which it was moved or, however, to the position that is necessary at that time.

In particular, a format part can comprise a wear profile, which serves to close any possibly existing gaps between individual railings in order to prevent containers from getting into these gaps. Typically, this can be a commercially available wear profile, or a band-shaped wear profile, or any other movable and flexible material. The wear profile can, for example, be guided along the railings. It can be of variable length, e.g. made of an elastic material, or it can include spare material which may be present e.g. on the sides of the format part and can be used if a longer length is required. In particular, the wear profile may be guided or guidable in accommodations of the railings (e.g. a profile in the railing).

According to the disclosure, each ankle joint of a toggle lever can be guided in a guide profile. Here the ankle joints can be guided directly in the guide profile or indirectly, e.g. via blocks to which the ankle joints are fastened, whereby the blocks are guided in the guide profile. This allows the movement range for the ankle joints to be specified and their position to be stabilized. The guide profile can, for example, be made of plastic. Optionally, the guide profile can include one or more stops for the toggle levers, so that the movement possibilities of the toggle lever are determined by the guide profile. For example, the guide profile can comprise a stop for the movement of the ankle joints in the direction parallel to the running direction of the railing. Alternatively, or in addition, the guide profile can guide the ankle joints in a direction perpendicular to the running direction of the railing in a form-fit manner.

According to the disclosure, the adjustment mechanisms, which can be, for example, traction means, can be deflected at the ends of the format part via deflection wheels, so that these do not have to revolve around excessively narrow curves.

In embodiments of a format part according to the disclosure, the toggle levers may be reinforced by reinforcing means, e.g. at the part of the toggle lever close to the ankle joints.

The disclosure also comprises an accumulating conveyor comprising one or more format parts previously described (and optionally contained in one, two or more carriages). The disclosure also comprises a method for adjusting a previously described format part. This method comprises, in particular, adjusting the toggle lever, for example by means of an adjustment aid, in order to set the format part to another container format. The method may further comprise all steps mentioned in this text in connection with a format part optionally comprised in a carriage and its use.

BRIEF DESCRIPTION OF THE DRAWINGS

Further embodiments and details are described with reference to the following figures, of which

DETAILED DESCRIPTION

The details which are respectively shown in the individual figures can all be combined with one another.

Figure 1A:
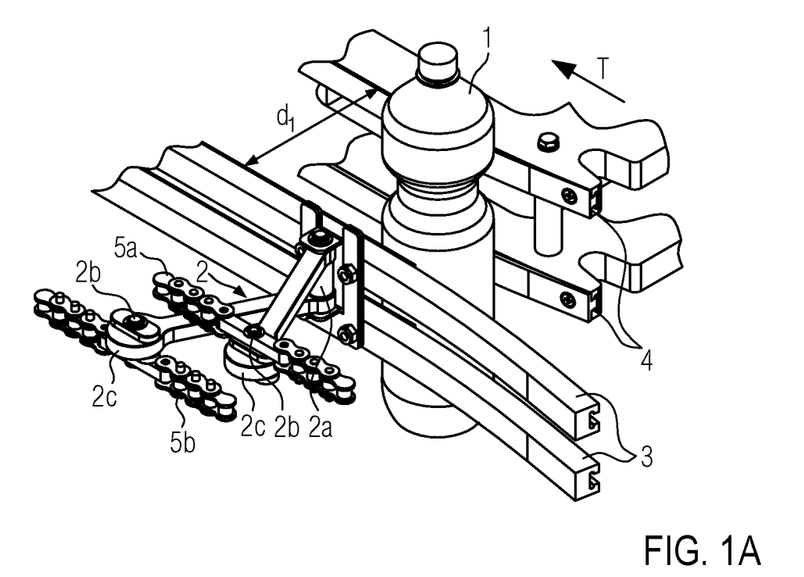
FIGS. 1A and 1B show schematically and not true to scale a section of a format part in two different positions.

FIG. 1A exemplarily shows a section of a format part for deflecting containers 1. In particular, a toggle lever 2 with ankle joints 2b and toggle joint 2a is plotted.

A railing 3 along which the containers 1 can be guided is fastened to the toggle joint 2a. In the example, only one container 1 is plotted, but these are typically guided along directly one behind the other (typically in contact with each other) or can at least be guided along in this way. Also plotted is guide 4 for container 1, which limits the direction of movement of containers to the opposite side of the railing 3. The guide for containers may be fixed (as shown) or, in alternative embodiments, may also be movable, e.g. also arranged on toggle levers (not shown). Containers 1 can be moved along the railing 3, in transport direction T or in the opposite direction. Containers are typically moved on a belt conveyor, conveyor belt, smooth surface or other conveyor. In some embodiments, the containers 1, e.g. on a smooth surface, can (only) be moved by the pressure of the subsequent containers.

The toggle lever 2 can be moved by adjustment mechanisms 5a and 5b, by which the ankle joints 2b of the toggle lever 2 can be moved against each other. In the illustrated embodiment, the adjustment mechanisms 5a and 5b are exemplarily plotted as traction means, here chains, which are each connected to an ankle joint 2b of the toggle lever, wherein the connection can optionally be direct or indirect (e.g. via one or more further components). The ankle joints 2b are here each exemplarily arranged in an optional thickening 2c, which can increase the stability of the ankle joints. In other embodiments there is no thickening, but the lever arms retain their thickness. The optional thickening, if available, can be arranged for example vertically to the axis of rotation of the ankle joint 2b (around the ankle joint). In the direction of the axis of rotation around which the ankle joints rotate, there may be a thickening or no thickening at the toggle lever.

By adjusting these adjustment mechanisms 5a, 5b and moving the ankle joints 2b against each other, the position of the railing 3 can be adjusted.

FIG. 1A exemplarily shows an adjustment in which the railing 3 is at a distance d1 from the guide 4.

Figure 1B:
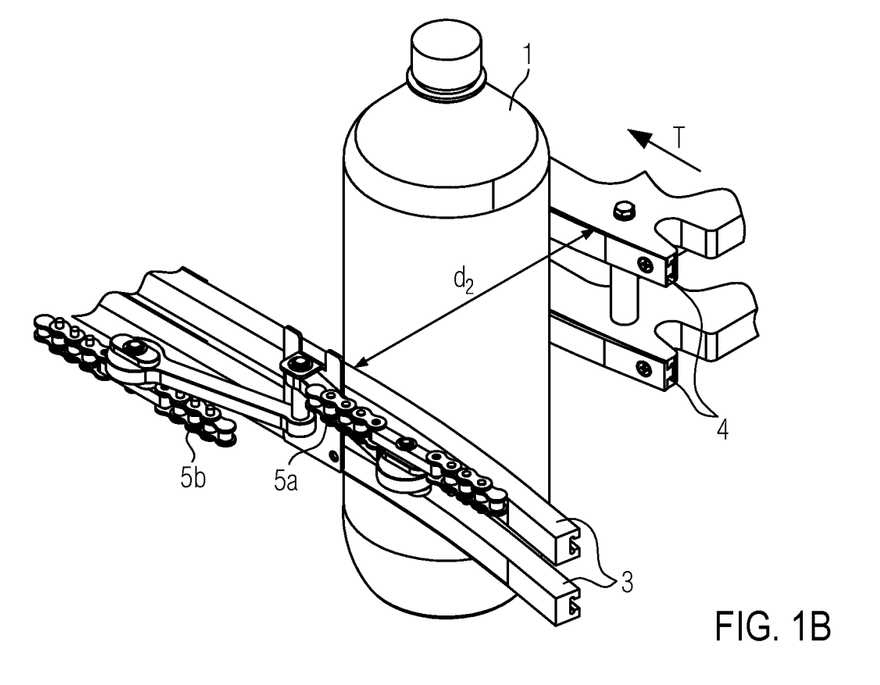

FIG. 1B shows an adjustment of a system as shown in FIG. 1A in which the ankle joints 2b of the toggle lever 2 have been moved apart by adjustment mechanisms 5a and 5b so that the railing 3 has a distance d2 from the guide 4 which is greater than d1 of FIG. 1A. Again plotted as an example is a container 1 which can be conveyed in this arrangement and is wider than container 1 of FIG. 1A.

The container sizes are not true to scale in comparison to the format part, but are only schematically plotted, just as other parts of the figure do not have to be true to scale.

In the embodiment shown in FIGS. 1A and 1B, the railing 3 may include a straight part and optionally a slightly curved part (on the right of the figure), also the guide 4. This slightly curved part of the railing may have the advantage that it makes it easier to move containers 1 between railing 3 and guide 4. In other embodiments, the railing may be curved more strongly or more strongly curved railings may be comprised, especially in the area where containers are deflected (not shown).

A railing may be configured in two parts as shown (thus e.g. comprising a first and second railing beam), or in one part or more than two parts (not shown). It may be fastened to a toggle lever via a coherent plate (as shown) or another component (when fastened to several toggle levers, it may be fastened to each toggle lever via a plate). In alternative embodiments with multi-part railings, each part of the railing can be fastened to the toggle lever via a separate component. The railing design described can be used in any of the figures described below.

The adjustment mechanisms 5a and 5b are advantageously movable against each other; the possible directions of movement are plotted in FIG. 1A and FIG. 1B. In particular, if the ankle joints 2b of the toggle lever 2 are very close to each other, the railing 3 can be moved away from the guide 4 by moving the ankle joints apart using the adjustment mechanisms 5a and 5b. In a position in which the ankle joints are very far apart from each other, the railing 3 can be moved again to guide 4 by moving the adjustment mechanisms 5a, 5b, which are here exemplarily designed as traction means (chains), in another direction than plotted in FIG. 1B.

Figure 2A:
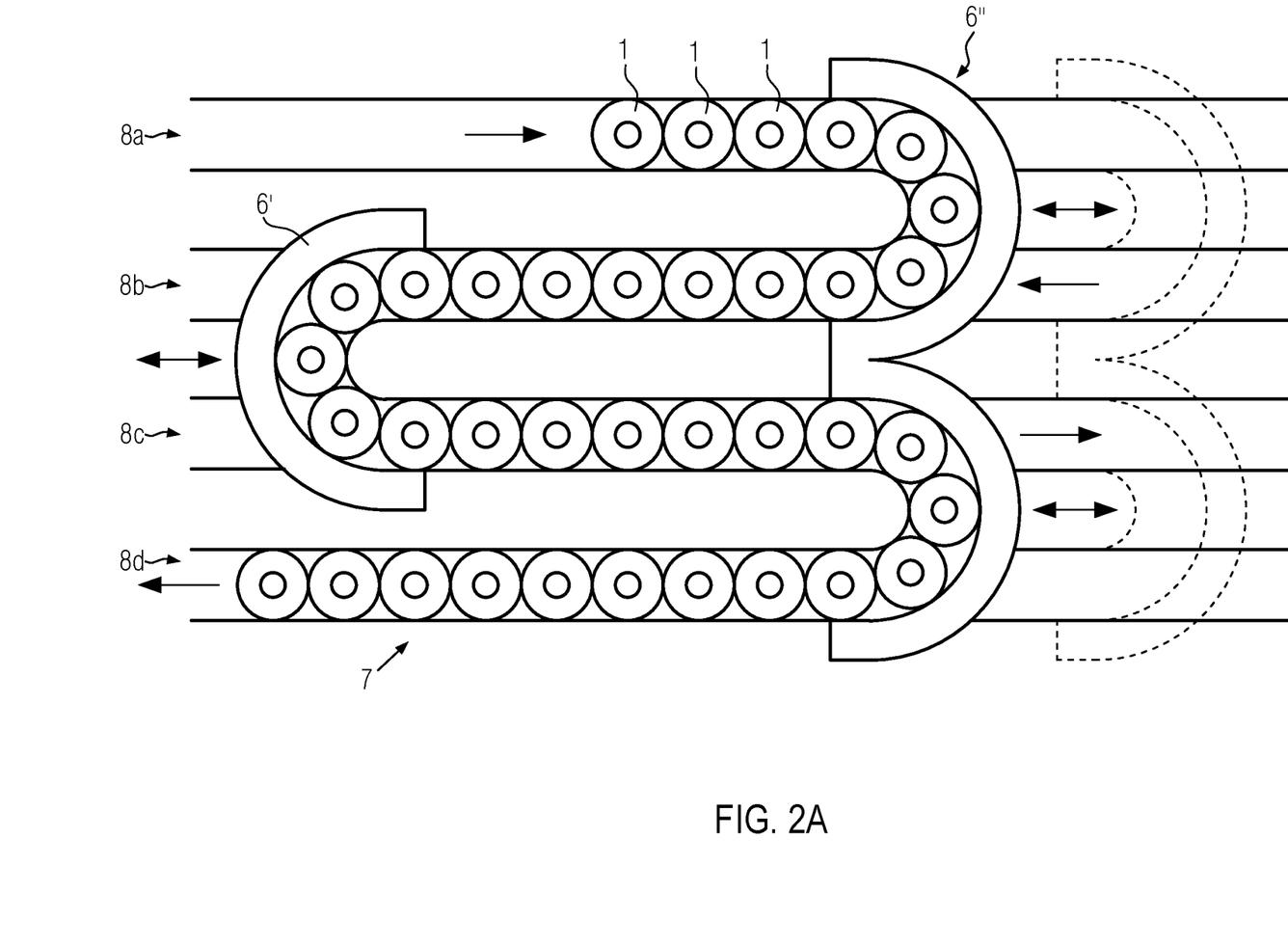
FIG. 2A shows an example of an accumulating conveyor.

FIG. 2A shows an example of a schematic accumulating conveyor 7. Here the accumulating conveyor exemplarily comprises four transport lanes 8a, 8b, 8c, 8d. In other embodiments it can comprise two, three or more than four lanes (not shown). Accumulating conveyor 7 is designed so that containers can each be conveyed in opposite direction on the transport lanes which are located directly next to each other, e.g. 8a and 8b, wherein the transport lanes in the example shown are parallel to each other. The containers 1, of which only three are provided with reference signs by way of example, are typically conveyed close to each other, i.e. in direct contact with each other. If containers 1 are now fed on lane 8a without containers being removed from lane 8d (or the corresponding last lane in a conveyor with fewer or more transport lanes), the space for containers 1 can be increased by moving the carriages 6', 6" in the direction parallel to the conveying direction of containers on transport lanes. Accordingly, if containers leave lane 8d (or the corresponding last transport lane) while no further containers are being fed, the space for containers can be reduced by moving the carriages 6', 6" (each of which may comprise one or more format parts). FIG. 2A shows a dashed example of a possible further position of the carriage 6" between the transport lanes 8a and 8b and 8c and 8d. Accordingly, carriage 6" can also be moved between transport lanes 8b and 8c, and other lanes if necessary. The adjustment of the positions of the carriages 6', 6" can be possible between an innermost position (which can be reached, for example, if the carriages 6', 6" lie directly against each other or if the accumulating conveyor can accommodate the minimum possible number of containers) and an outermost position (in which as many containers as possible can be in the accumulating conveyor), whereby the adjustment of the positions of the carriages can optionally be continuously variable.

In the illustrated example, carriage 6' is plotted, which exemplarily comprises a format part, and carriage 6", which exemplarily comprises two format parts, which are configured to divert containers 1 on a single track from a first direction (on transport lanes 8a, 8c) to a second direction (on transport lanes 8b, 8d). In other embodiments more or less transport lanes may be provided, and carriage 6' may optionally comprise more than one format part, e.g. two or three or more, and/or carriage 6" may comprise only one or more than two, e.g. three or more format parts (not shown). In yet other embodiments, an accumulating conveyor 7 may also comprise only one carriage 6' or 6" (not shown).

Figure 2B:
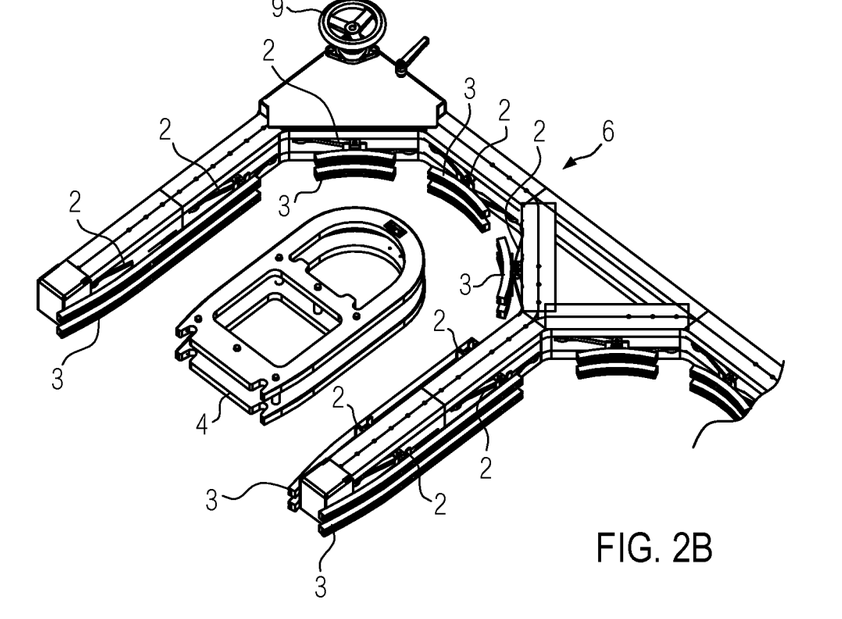
FIGS. 2B and 2C exemplarily show sections of a carriage of an accumulating conveyor.
Figure 2C:
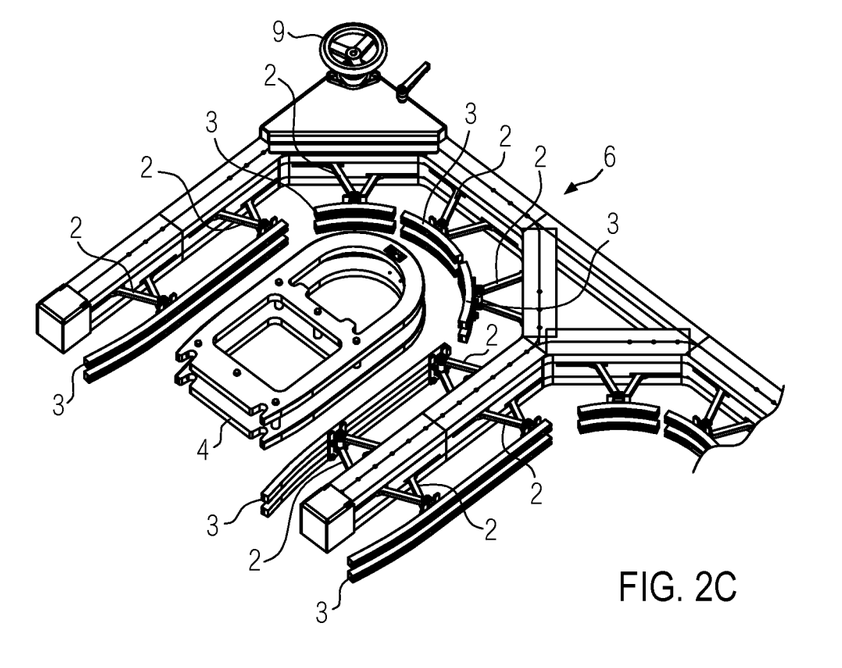

FIGS. 2B and 2C show examples of sections of a carriage 6 and an accumulating conveyor 7. The details of the carriage from FIGS. 2B, 2C may for example be details of a carriage 6' and/or 6" as shown in FIG. 2A. In particular, FIG. 2B shows the toggle levers 2, the railings 3 and the guide 4 of carriage 6. Also plotted is an example of a handwheel 9 with which the adjustment mechanisms 5a and 5b (not visible in FIG. 2D) can be adjusted.

In the example shown, guide 4 for container 1 is fixedly arranged, along the inner circle, and is not changed when the format is changed. Railings 3 can be adjusted by toggle levers 2.

FIG. 2B shows an adjustment of the carriage 6 in which wider containers can be transported than in FIG. 2C where the toggle levers are adjusted so that the ankle joints 2a are relatively close to each other so that the distance between railing 3 and guide 4 is less than in FIG. 2B.

In FIGS. 2B and 2C it is shown that a format part for container 1 may comprise several railings, in particular in the example shown two longer railings 3 facing each other and comprising a straight part and a slightly curved part (at the inlet and outlet, respectively, of the containers into the deflecting device) and each fastened e.g. to two toggle levers, and in this example exemplarily three curved railings for deflecting the containers, each fastened to a toggle lever 2. Other railings 3 can also be used in other embodiments, in particular more or less railings with straight elements and/or more or less curved railings.

There are gaps between the respective railings 3, especially when conveying wide containers, which gaps are typically closed by wear profiles (not shown in FIGS. 2B, 2C). Also schematically plotted in FIG. 2B is that a carriage 6 of an accumulating conveyor 7 may not only be designed to deflect containers 1 from one lane to another, but may optionally be designed to simultaneously guide containers from several parallel lanes to several parallel lanes. Especially in accumulating conveyors with 4 or more lanes such carriages 6 can be used advantageously.

In the example shown in FIG. 2B, a carriage 6 is exemplarily plotted, which can deflect containers from 2 lanes to 2 further lanes. However, the second (in the figure right) format part of the carriage 6 is only schematically plotted and with less details than the left format part of the carriage 6, since it is typically constructed in the same way with regard to railing and toggle lever. Only the adjustment aid, here handwheel 9, is typically only present at one point of a carriage, here exemplarily at the left format part. In other embodiments, the adjustment aid, e.g. the handwheel, may also not be comprised by the carriage.

Typically, in the case of such carriages 6 for accumulating conveyors 7, all toggle levers 2 are simultaneously adjustable via adjustment mechanisms 5a and 5b, wherein typically the adjustment mechanisms 5a, 5b run over the outer radius of the format parts and/or the carriage (this typically increases the curve radius along which adjustment mechanisms 5a, 5b must run, and thus makes them smoother running). Simultaneous adjustability of all toggle levers can be advantageous as all toggle levers 2 can then be adapted simultaneously by operating the handwheel 9 (or alternatively another adjustment aid for adjusting the adjustment mechanisms 5a, 5b), typically even with one hand.

Figure 2D:
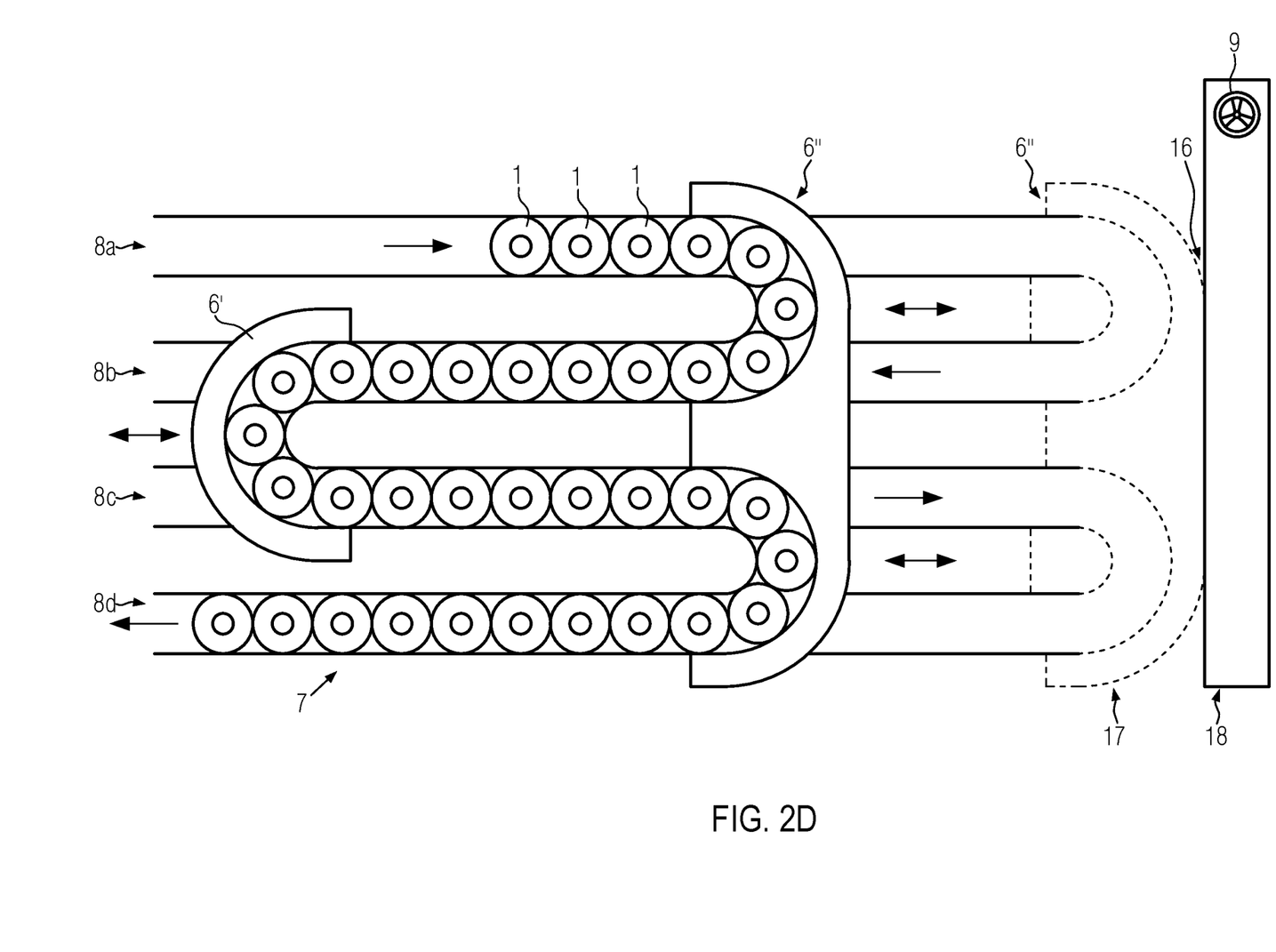
FIG. 2D shows an example of an accumulating conveyor with a stationary adjustment aid.

FIG. 2D shows an accumulating conveyor 7 with a stationary adjustment unit 18, which transports containers 1 as shown in FIG. 2A. If a wider or narrower container is now to be transported, the carriages 6" can be moved into the outermost position of the accumulating conveyor 17. There is the stationary adjustment unit 18, which can continuously adjust all format parts of the carriage 6" via an adjustment aid, here handwheel 9, and a transfer device 16. The adjustment aid of the stationary adjustment unit 18 can be in other embodiments, instead of a handwheel 9, for example a (servo) motor, a hydraulic system or another comparable adjustment aid for adjusting the adjustment mechanisms 5a, 5b via the transfer device 16. The stationary adjustment unit can be located below or behind the transport table, so that the transfer device 16 engages in the adjustment mechanisms 5a and 5b. If the format parts of the carriage 6" are set to the new container, it can be moved, in turn, to another position (e.g. the one required at that time). A further stationary unit 18 can optionally be comprised for the carriage 6' as well. For example, this unit can be mounted at the entrance of the accumulating conveyor below the transport table. For the sake of clarity, this is not shown graphically.

Figure 2E:
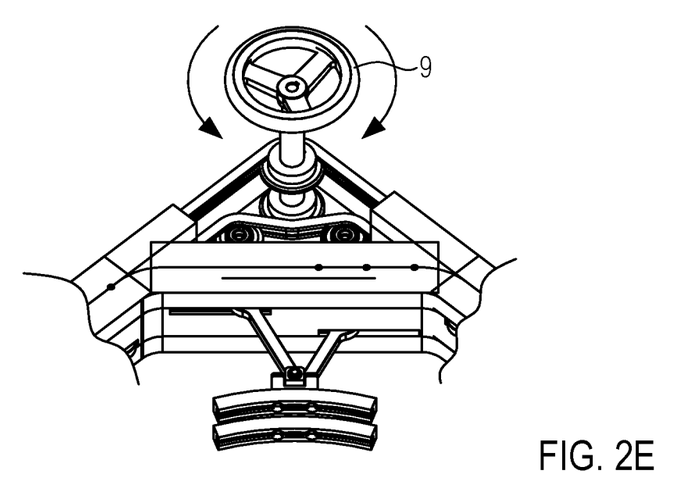
FIG. 2E shows a handwheel for adjusting the adjustment mechanisms.

FIG. 2C shows the carriage 6 in a position in which the toggle levers are set so that thinner containers than in FIG. 2B can be guided along the railing 3 and guide 4. An optionally existing second (or more) deflection device of the carriage 6 is also schematically indicated. FIG. 2E shows a section of a possible format part for deflecting containers 1 with a handwheel 9, which in particular can be designed to adjust, with adjustment mechanisms 5a, 5b, the entire carriage or an entire format part for deflecting containers simultaneously. For example, by turning the handwheel by approx. 100°, the toggle levers can be moved from a first position, in which the ankle joints of the toggle levers 2 are as close as possible to each other, to a second position, in which the ankle joints of the toggle levers are as far apart as possible.

Of course, all intermediate positions can also be set.

Figure 3:
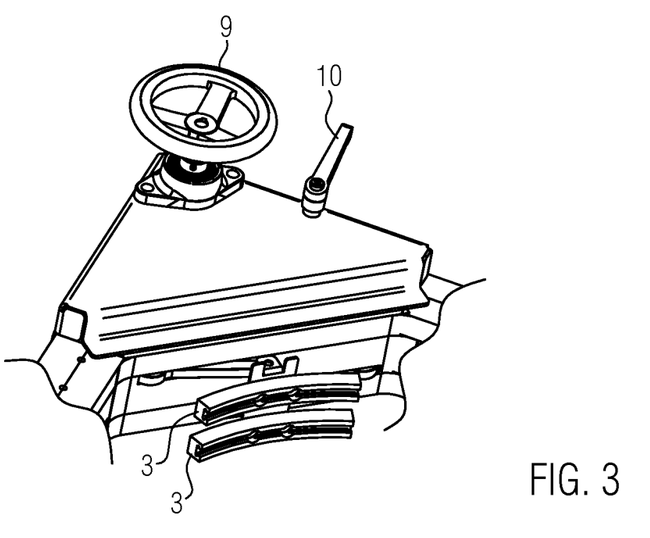
FIG. 3 schematically shows a section of a format part according to the disclosure.

FIG. 3 also shows a section of a format part in which adjustment mechanisms 5a, 5b can be adjusted on the handwheel 9 (in other embodiments, an adjustment aid other than a handwheel can be used, e.g. a (servo) motor, a hydraulic system or another comparable means). Also plotted is an example of a clamping lever 10 which can prevent adjustment of the adjustment mechanisms 5a, 5b after setting into the correct position. For example, the clamping lever 10 can engage in or clamp the adjustment mechanisms 5a, 5b. In alternative embodiments, other means can also be used to lock the adjustment mechanisms 5a, 5b.

Also visible as an example in FIG. 3 is the railing 3 from the side assigned to the containers during operation. Profiles plotted by way of example, in which, for example, wear profiles can be guided along (in a form-fit manner), are running in the railing 3. In each of the figures shown, the railing 3 can comprise such profiles.

Figure 4A:
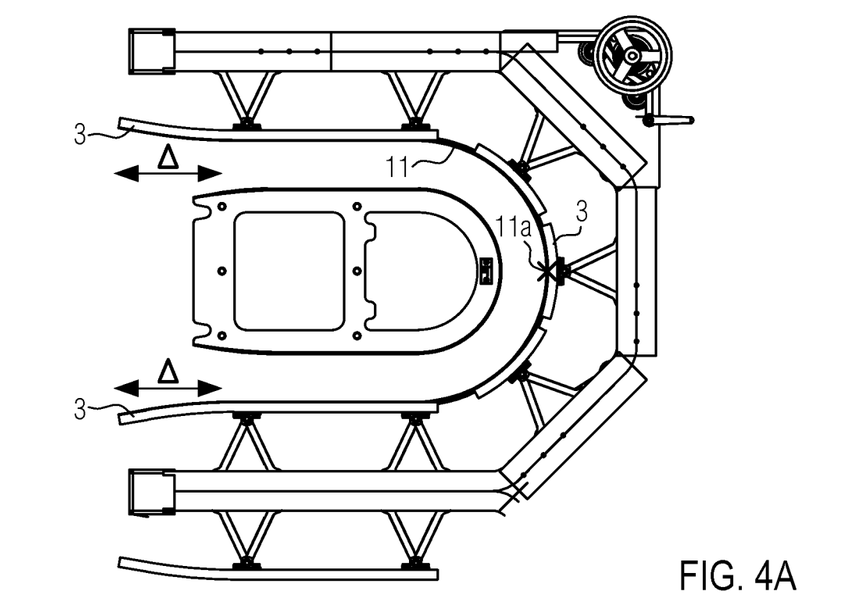
FIGS. 4A and 4B exemplarily show details of a format part.
Figure 4B:
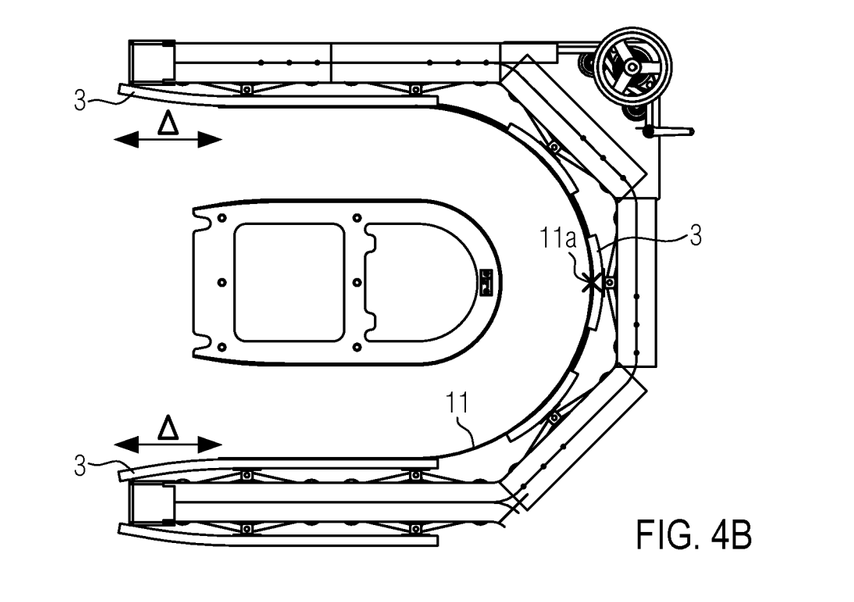

FIGS. 4A and 4B show sections of a carriage that comprises more than one format part (here, for example, only a section of the carriage 6" shown in FIG. 2A on the right is shown). In other embodiments where the carriage 6 comprises only one format part, the toggle levers and railings plotted on the underside of the picture may not be present.

In the embodiment shown, a wear profile 11 is guided along the railing 3, wherein this may be guided, for example, in the profiles 3, as shown in FIG. 3. Typically, the wear profiles are immovably fixed at at least one point, for example at the middle railing 3 (at the vertex of the format part) at the point marked X. It is also plotted that this wear profile 11, which serves to close gaps between railings 3 so that containers 1 cannot deviate from their path, are movable in an area relative to the other railings 3 to which they are not fixedly fastened, here by a distance Δ, so that when the toggle levers are adjusted, the wear profile 11 still closes all gaps between railings 3. FIG. 4A shows an arrangement in which the toggle levers 2 are set so that thin containers can be conveyed, FIG. 4B shows an arrangement in which thicker containers can be conveyed. As shown in FIG. 4B, during adjustment of the toggle levers 2, the wear profile 11 can then move relative to the railings 3, to which it is not firmly fastened, here by the distance Δ, so that in both situations containers can be guided past the gaps between railings 3 by the wear profile 11. Although in the plan view only one wear profile is shown and in some embodiments only one wear profile is comprised for the whole railing, in other embodiments, e.g. with multi-part railings, e.g. two-part railings with two railing beams as in FIG. 1, each railing beam may have its own wear profile at a respective height.

In other embodiments (not shown here), the wear profile can also be made elastic or fastened elastically to the outer railings 3 so that it always comes to lie in the correct position during adjustment of the toggle levers 2. In other alternative embodiments, the wear profile can be flexible but stiff enough that a fastening at one point is sufficient and that it always comes to rest suitably on the railings 3 due to its own counter-pressure even when the toggle levers are adjusted.

In embodiments in which carriages 6 comprise more than one format part, a separate wear profile can be provided for each deflecting device or one wear profile for all format parts.

Figure 5A:
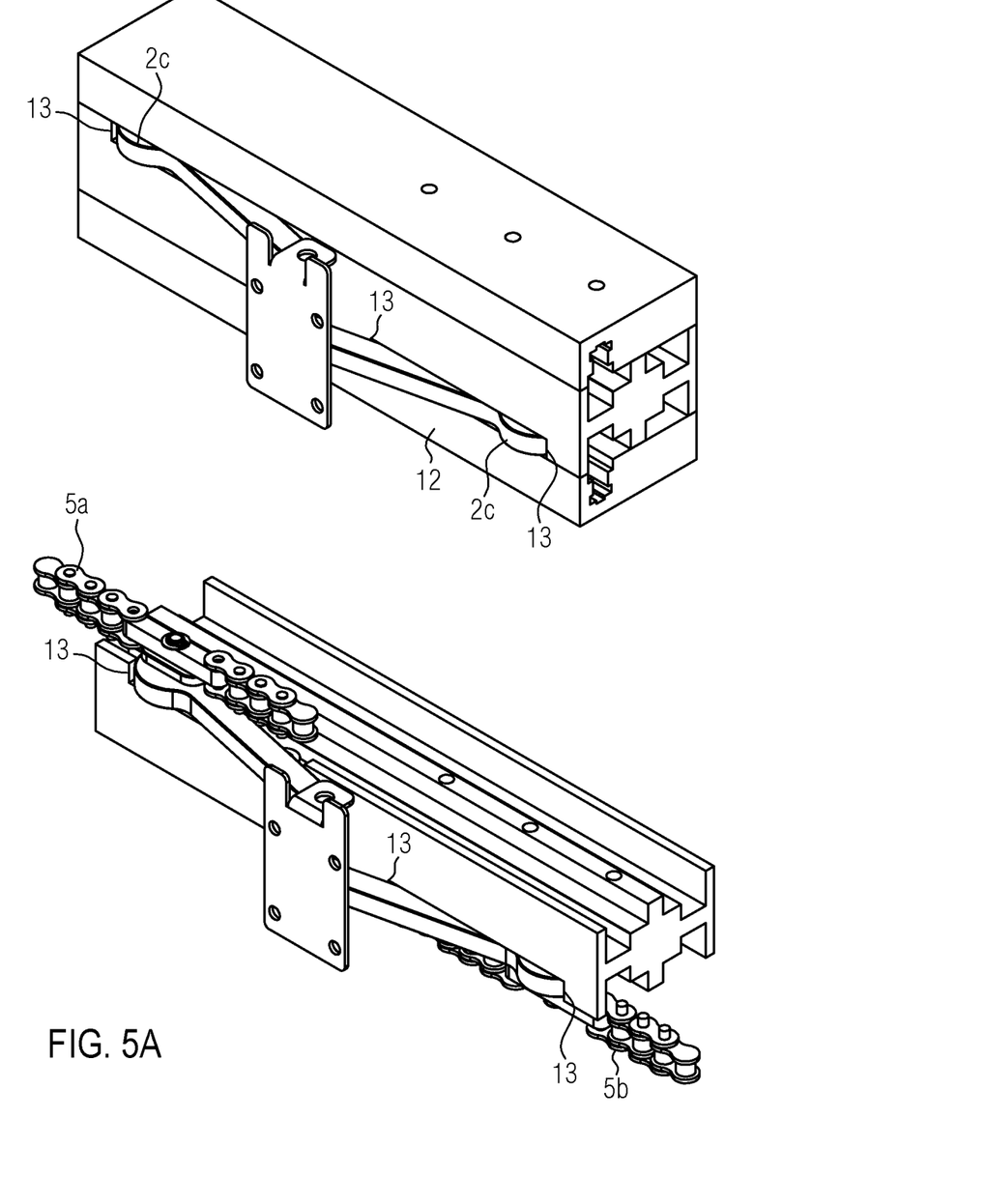
FIGS. 5A, 5B and 5C exemplarily show details of possible embodiments of a format part.
Figure 5B:
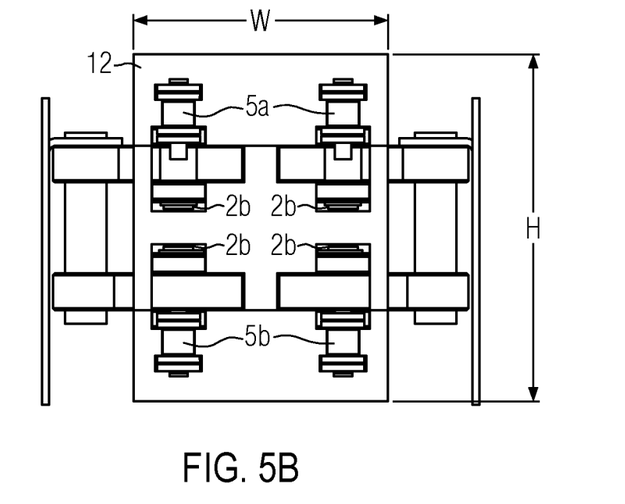
Figure 5C:
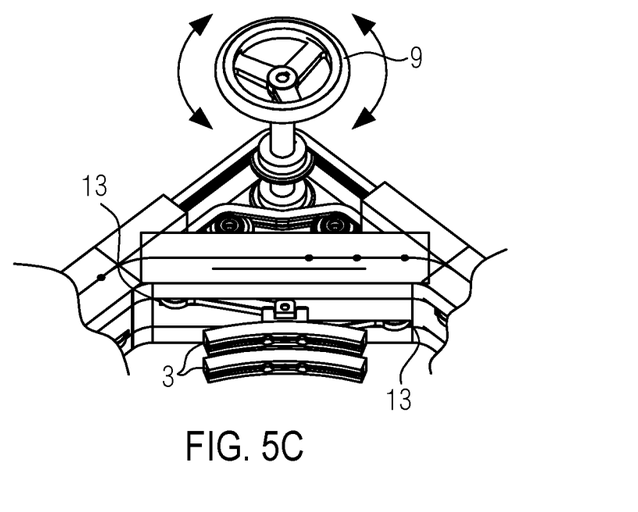

FIGS. 5A, 5B and 5C show exemplary sections of possible embodiments of a format part. In particular, FIG. 5A shows a guide profile 12 for the ankle joints 2b (here with optional thickenings 2c) from the outside and as a cross-section. As in the example shown in FIG. 5A, thickening 2c (and thereabove ankle joint 2b) can be guided in a form-fit manner through the guide profile 12. Also plotted is an example of an adjustment mechanism 5a. Adjustment mechanism 5b on the other ankle joint of the toggle lever is not visible at the selected viewing angle in FIG. 5A. Thickening 2c and thus ankle joints 2b can be mounted in a form-fit manner in the guide profile 12. In other embodiments (not shown), the ankle joint 2b can be fastened to one or more components which are guided in a form-fit manner through the guide profile 12 (and are mounted therein) and thus indirectly guide ankle joint 2b. Also plotted are stops 13 of the guide profile which limit the movement of the ankle joints 2a of the toggle levers 2.

FIG. 5B shows a schematic section through such a guide profile 12 in a direction perpendicular to the front, which is shown in FIG. 5A. However, this is a guide profile 12 as it would look, for example, with a cross-section through the middle arm of a carriage of an accumulating conveyor 6" as plotted in FIG. 2A (i.e. the arm between lanes 8b, 8c in FIG. 2A), at which containers are deflected from at least 2 lanes to at least 2 lanes, i.e. which has toggle levers 2 and railing 3 arranged on two opposite sides. Here it is visible how adjustment mechanisms 5a and 5b run through the entire guide profiles and thus adjust toggle lever 2, wherein only the ankle joints 2b are shown here as an example.

FIG. 5C shows an example of a handwheel 9 (which in other embodiments can also be designed differently, for example as a servo motor, hydraulic system or similar) and stops 13 for limiting the movement of the ankle joints 2b.

Figure 6A:
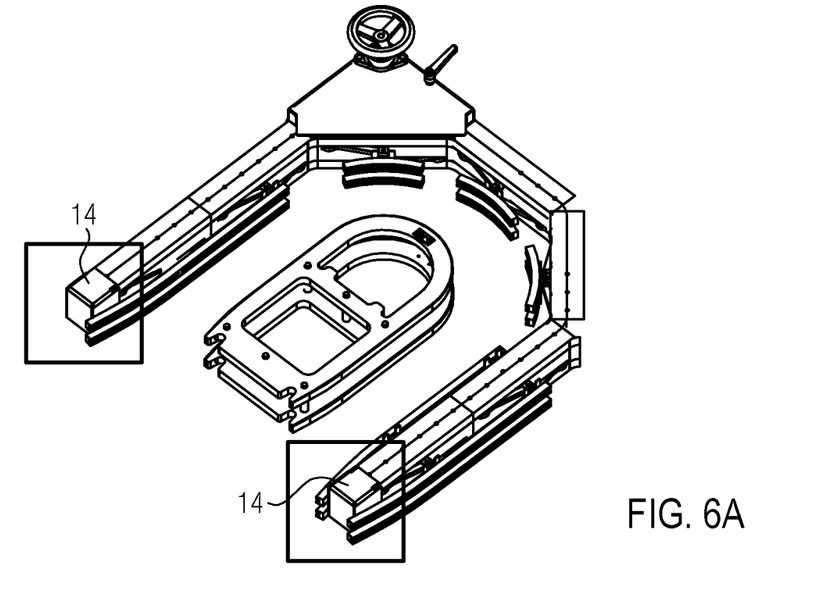
FIGS. 6A and 6B show possible details of format parts.
Figure 6B:
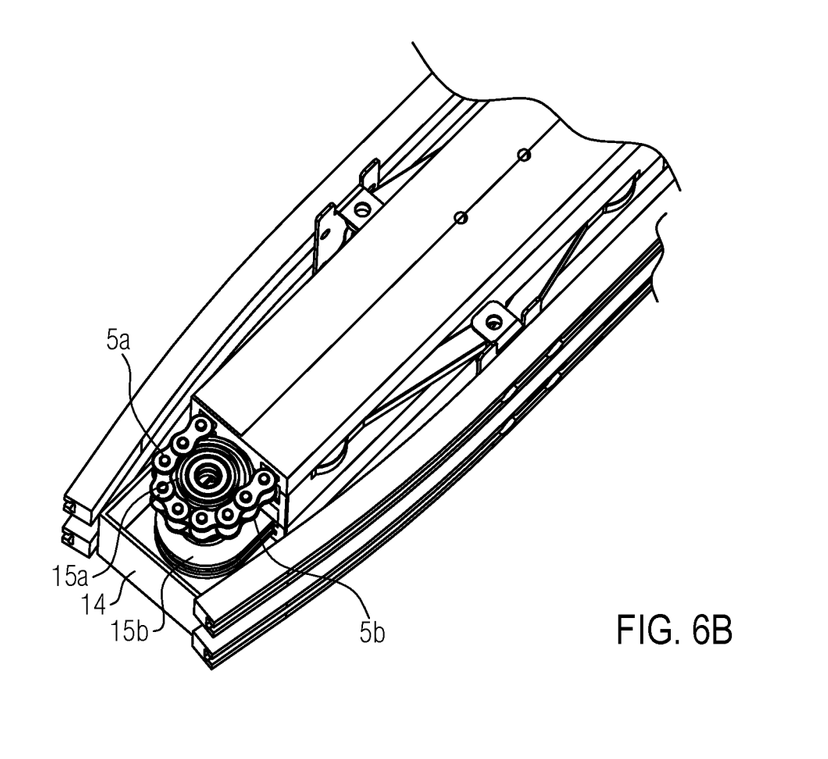

FIGS. 6A and 6B show possible details of a format part. It can be seen how adjustment mechanisms 5a and 5b can be deflected at the ends 14 of the format part. FIG. 6B shows the adjustment mechanisms 5a, 5b at the ends 14 of a format part partially in cross section. In particular, the adjustment mechanisms 5a, 5b can be guided at the ends 14 around deflection pulleys 15a and 15b so that the adjustment mechanisms 5a, 5b do not have to run excessively narrow curves and can reach all toggle levers 2 of the format parts in an improved manner.

Figure 7:
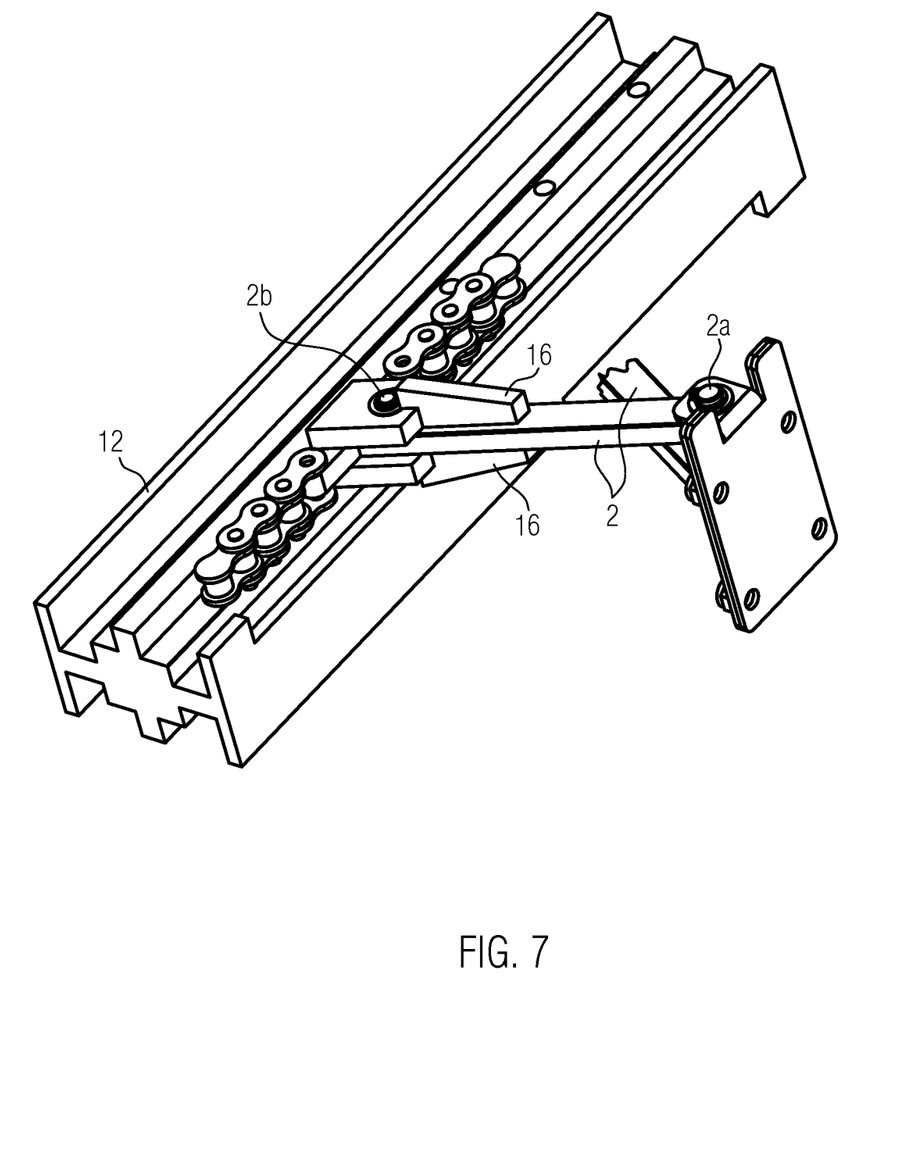
FIG. 7 shows a section of an exemplary format part.

FIG. 7 shows a section of an exemplary format part. The guide profile 12, through which the ankle joints 2b of each toggle lever 2 with toggle joint 2a are guided indirectly via one (or more) further components, is particularly visible here. As an example only for the upper lever arm (top in the figure) reinforcing means 16 are plotted here, which serve to reinforce the lever. Typically, such reinforcing means 16 are arranged not only on one lever arm connected with ankle joint 2b, but on both lever arms connected from the ankle joints 2b, so that a corresponding reinforcing means would also be arranged on the other lever arm. However, this is not shown here for better visibility. An arrangement in which the ankle joints 2b of a toggle lever are guided indirectly through the guide profile 12 via one or more other components can be used in all other embodiments described above. Reinforcing means can also be provided as an option in all the embodiments described above.

The invention claimed is:

1. A format part for deflecting containers, comprising a toggle lever which comprises a toggle joint and two ankle joints, wherein the format part comprises a railing fastened to the toggle joint of the toggle lever, wherein the ankle joints are displaceable in one plane, which is parallel to a running direction of the railing, and wherein the railing is displaceable parallel to the plane by the displacement of the ankle joints, wherein the format part is adaptable for different container formats by the displacement of the railing, wherein the format part comprises a fixed guide for containers and, opposite thereto, the railing.

2. The format part for deflecting containers according to claim 1, wherein the format part comprises a plurality of toggle levers and a plurality of railings.

3. The format part for deflecting containers according to claim 1, wherein the format part comprises a railing with a straight part and/or a railing with a curved part.

4. A format part for deflecting containers, comprising a toggle lever which comprises a toggle joint and two ankle joints, wherein the format part comprises a railing fastened to the toggle joint of the toggle lever, wherein the ankle joints are displaceable in one plane, which is parallel to a running direction of the railing, and wherein the railing is displaceable parallel to the plane by the displacement of the ankle joints, wherein the format part is adaptable for different container formats by the displacement of the railing, wherein two opposing adjustment mechanisms are fastened to the ankle joints of the toggle lever, and wherein the adjustment mechanisms are lockable via a clamping lever or a self-stopping mechanism.

5. The format part for deflecting containers according to claim 1, wherein the format part is comprised in a carriage of an accumulating conveyor, wherein the carriage of the accumulating conveyor comprises two or more format parts.

6. The format part for deflecting containers according to claim 4, wherein the adjustment mechanisms are simultaneously adjustable.

7. The format part for deflecting containers according to claim 4, wherein the adjustment mechanisms are adjustable via an adjustment aid or automatically.

8. The format part for deflecting containers according to claim 1, wherein the format part comprises a wear profile.

9. A format part for deflecting containers, comprising a toggle lever which comprises a toggle joint and two ankle joints, wherein the format part comprises a railing fastened to the toggle joint of the toggle lever, wherein the ankle joints are displaceable in one plane, which is parallel to a running direction of the railing, and wherein the railing is displaceable parallel to the plane by the displacement of the ankle joints, wherein the format part is adaptable for different container formats by the displacement of the railing, wherein the ankle joints are guided in a guide profile, wherein the guide profile is made of plastic, and wherein in the guide profile a stop for the toggle lever is comprised.

10. The format part for deflecting containers according to claim 4, wherein the adjustment mechanisms are deflected at ends of the format part via deflection wheels.

11. The format part for deflecting containers according to claim 1, wherein the toggle joints are reinforced by reinforcing means.

12. The format part for deflecting containers according to claim 7, wherein the adjustment aid is a handwheel.

13. The format part for deflecting containers according to claim 4, wherein the adjustment mechanisms are guided over outer radii of the format part.

\* \* \* \* \*